United States Patent
Hasegawa et al.

(10) Patent No.: US 7,599,368 B2
(45) Date of Patent: Oct. 6, 2009

(54) COMMUNICATION SYSTEM

(75) Inventors: Teruyuki Hasegawa, Saitama-Ken (JP); Toru Hasegawa, Saitama-Ken (JP)

(73) Assignee: KDDI Corporation, Tokyo (JP)

( * ) Notice: Subject to any disclaimer, the term of this patent is extended or adjusted under 35 U.S.C. 154(b) by 547 days.

(21) Appl. No.: 11/326,816

(22) Filed: Jan. 6, 2006

(65) Prior Publication Data

US 2006/0198373 A1 Sep. 7, 2006

(30) Foreign Application Priority Data

Mar. 7, 2005 (JP) .............................. 2005-062293

(51) Int. Cl.
H04L 12/28 (2006.01)
(52) U.S. Cl. .................... 370/390; 370/229; 370/394
(58) Field of Classification Search ................ 370/390, 370/241, 432, 394, 503, 464, 351, 229, 395.52
See application file for complete search history.

(56) References Cited

U.S. PATENT DOCUMENTS 6,269,080 B1 * 7/2001 Kumar ........................ 370/236
6,430,153 B1 * 8/2002 Hughes et al. ............ 370/230.1
6,845,091 B2 * 1/2005 Ogier et al. ................. 370/338
2003/0206554 A1 * 11/2003 Dillon ......................... 370/432

FOREIGN PATENT DOCUMENTS

JP 2005-252670 9/2005

OTHER PUBLICATIONS

Beau Williamson, "IP Multicast Network Development Guide vol. 1," Softbank Publishing Corp., Jul. 3, 2001.
M. Handley et al., "The Reliable Multicast Design Space for Bulk Transfer," The Internet Society, 2000.

* cited by examiner

Primary Examiner—Dang T Ton
Assistant Examiner—Nourali Mansoury
(74) Attorney, Agent, or Firm—David G. Conlin; Steven M. Jensen; Edwards Angell Palmer & Dodge LLP

(57) ABSTRACT

A communication system includes: a probe transmission server which transmits packets of a probe multicast at certain intervals on a same path as that of a main multicast; an aggregation server which converts multiple main cast and the probe multi cast into an aggregative multicast; and a communication control apparatus which determines an overall communication condition of the packets of the main multicast based on intervals of the probe multicast, wherein the communication control apparatus receives and recovers the packet of the main multicast from the packet of the aggregative multicast, if a communication break of the main multicast is detected.

6 Claims, 10 Drawing Sheets

COMMUNICATION SYSTEM

BACKGROUND OF THE INVENTION

1. Field of the Invention

The present invention relates to a communication system which distributes continuous stream packets from at least one server to multiple clients via an IP network.

Priority is claimed on Japanese Patent Application No. 2005-62293, filed Mar. 7, 2005, the content of which is incorporated herein by reference.

2. Description of Related Art

To implement a service such as video distribution, a multicast is defined in an open systems interconnection (OSI) Layer-3 internet protocol (IP), and various types of protocols corresponding thereto are implemented and executed (see e.g. Non-Patent Document 1: Beau Williamson, "IP Multicast Network Development Guide Vol. 1" Softbank Publishing Corp., Jul. 3, 2001.). Various types of highly reliable multicast communication protocols for supporting multicasts without losing data have been proposed (see e.g. Non-Patent Document 2: M. Handley et al., "The Reliable Multicast Design Space for Bulk Transfer" The Internet Society, 2000).

One general example of a packet loss compensation system in a multicast distribution network currently in active use is a forward error correction (FEC) based system, disclosed in Non-Patent Document 2. In this method, error correction information relating to one or a number of packets is transmitted simultaneously with the relay data, or multiplexed as appropriate, and errors are corrected on the receiving side. Non-Patent Document 2 also discloses various systems based on data retransmission in accordance with an acknowledgement (ACK) or a negative-acknowledgement (NACK) from the receiving side.

However, even if a high-reliability IP network is constructed using a router (L3 (Layer-3)) with a redundant configuration, a time of approximately several seconds to several tens of seconds is required for conventional multicast path control protocols due to dynamic changes in the multicast distribution path which comes with L3 switch/link disorders and the like. All data distributed during this period is lost.

In the FEC-based packet loss compensation system, a fixed rate of redundant data must be relayed irrespective of whether or not there are packet losses. This makes it impossible to compensate for a large amount of continuous packet loss of the type mentioned above. Moreover, retransmission-based systems require the addition of an ACK/NACK reply function on the terminal side, and the addition of a retransmission function to the router and the transmission terminal. Protocols which guarantee the arrival of all packets are problematic in that they do not guarantee the arrival times.

In view of the above problems, the present inventors have disclosed in Japanese Patent Application No. 2004-060528 a technique, used when implementing a broadcast-type multicast communication service using an IP network having a redundant configuration, for compensating for communication breaks caused when disorders in the IP network are detected and repaired. In Japanese Patent Application No. 2004-060528, the present inventors have disclosed a technique for achieving a higher level of compensation for communication breaks and for reducing the traffic on the network. There is also a demand to reduce traffic on networks on which there are plural multicasts.

SUMMARY OF THE INVENTION

A first aspect of the present invention is a communication system on an IP network which supports multicast communication in broadcast-type multicast communication, including: a distribution server which transmits multiple packets in a broadcast form of a main multicast that are distributed on a same path; a probe transmission server which transmits packets of a probe multicast at certain intervals on the same path as that of the main multicast; a delay insertion server which transmits the packets of the main multicast and the probe multicast to the IP network after inserting a certain delay; an aggregation server which converts the multiple packets of the main multicast and the probe multicast into an aggregative multicast; a backup server which copies a packet of the aggregative multicast, transmits the copied packet to the IP network as a packet of a synchronized backup multicast, and transmits the copied packet to the IP network as a packet of a delayed backup multicast after inserting a certain delay; and a communication control apparatus which receives the packet of the probe multicast from the IP network, determines an overall communication condition of the multiple packets of the main multicast based on intervals of the packet of the probe multicast, wherein the communication control apparatus receives the packets of the delayed backup multicast and the synchronized backup multicast from the IP network and recovers the packet of the main multicast, if a communication break of the multiple packets of the main multicast is detected.

A second aspect of the present invention is a communication system according to the first aspect, wherein the aggregation server aggregates the multicast in an IP encapsulation method.

A third aspect of the present invention is a communication system according to the first aspect, wherein the aggregation server embeds recovery information in a predetermined field of a header of the packet to be aggregated.

A fourth aspect of the present invention is a communication system according to the third aspect, wherein the recovery information is converted to have a data length of the predetermined field with a predetermined conversion function.

A first aspect of the present invention is a communication system according to the fourth aspect, wherein a correspondence between the multicast to be aggregated and the recovery information after the conversion is embedded into the packet of the probe multicast and notified the communication control apparatus.

DETAILED DESCRIPTION OF THE INVENTION

An embodiment of this invention will be explained with reference to the figures.

Figure 1:
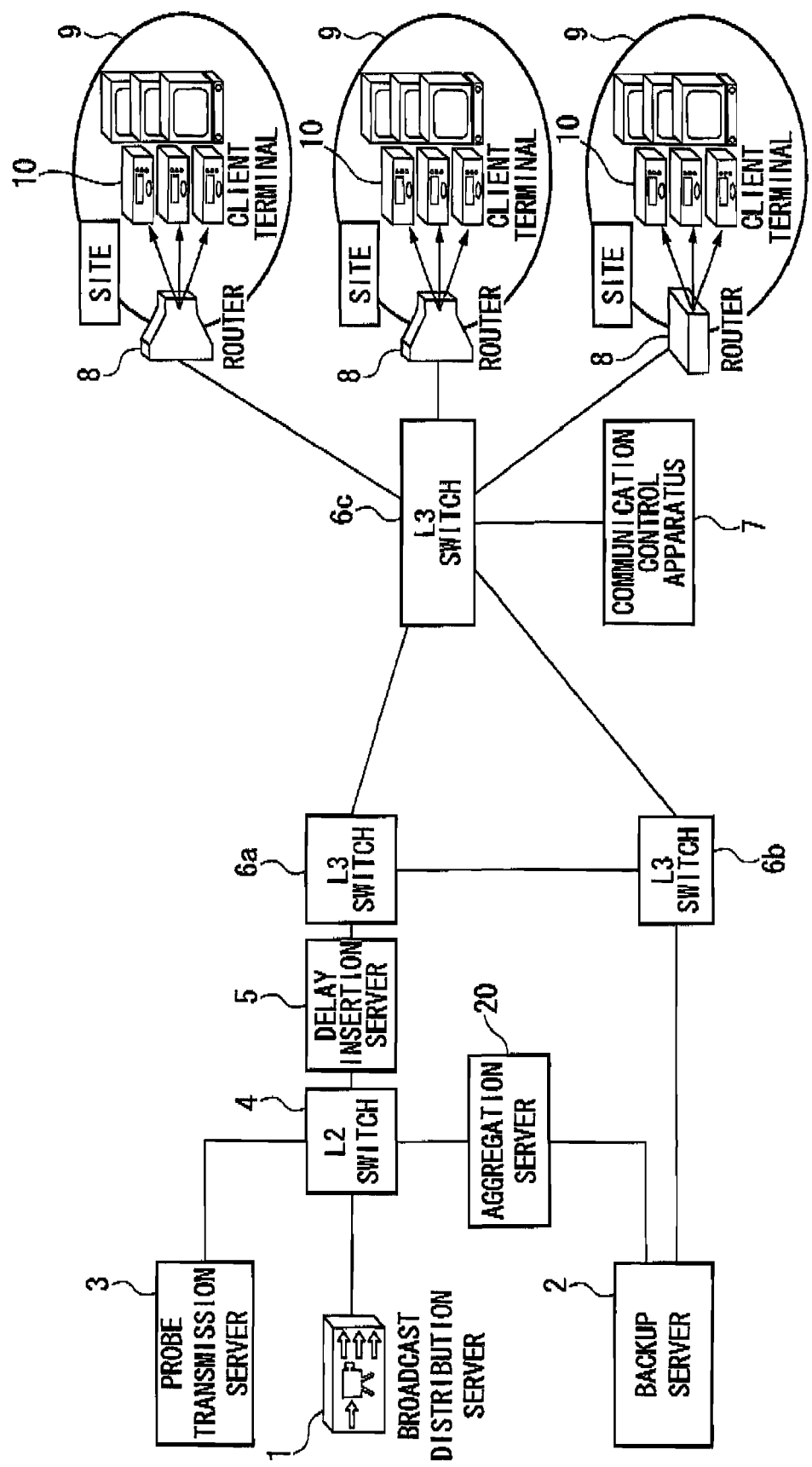
FIG. 1 is a schematic diagram of the configuration of a broadcast-type multicast communication system according to an embodiment of this invention.

FIG. 1 is a schematic diagram of the configuration of a broadcast-type multicast communication system according to an embodiment of this invention. This system implements a broadcast-type multicast communication service.

In FIG. 1, a broadcast distribution server 1 is connected to a Layer-2 (L2) switch 4 having a TAP function (hereinafter abbreviated as "L2 switch"). A backup server 2 is connected to both an aggregation server 20 and a Layer-3 (L3) switch 6b. A probe transmission server 3 is connected to the L2 switch 4. A delay insertion server 5 is connected to both the L2 switch 4 and the L3 switch 6a. The aggregation server 20 is connected to both the L2 switch 4 and the backup server 2. The aggregation server 20 is located on the communication path from the broadcast distribution server 1 and probe transmission server 3 to the backup server 2.

The backup server 2, the probe transmission server 3, the delay insertion server 5 and the aggregation server 20 are located close to the broadcast distribution server 1. The probe transmission server 3 is located on a same subnetwork as the broadcast distribution server 1.

The L3 switches 6a, 6b and 6c are connected each other and form an IP network which conducts a broadcast-type multicast communication. The L3 switch 6c which is at the edge closest to a client is connected to a communication control apparatus 7. The communication control apparatus 7 is located near the L3 switch 6c.

The L3 switch 6c is connected to a router 8. Clients of the broadcast-type multicast communication service subscribe to a site 9. Client terminals 10 are connected to the routers 8 of its sites 9.

The process of the broadcast-type multicast communication is described with reference to FIG. 1 below.

Figure 2:
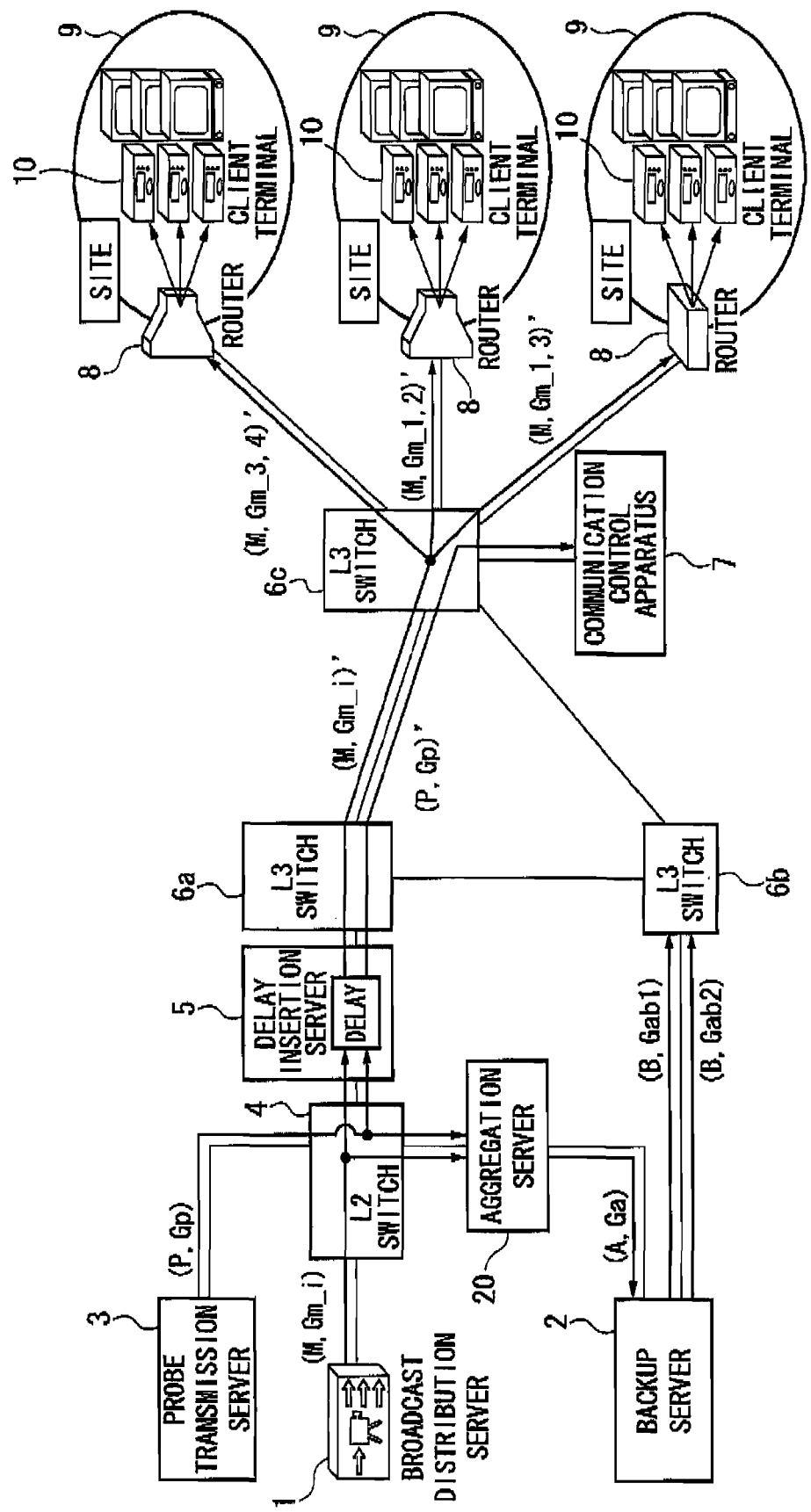
FIG. 2 is an explanatory diagram of a normal state operation of the broadcast-type multicast communication system shown in FIG. 1.

First, the process under normal conditions of the broadcast-type multicast communication system shown in FIG. 1 is described. FIG. 2 is an explanatory diagram which shows the process under normal conditions of the broadcast-type multicast communication system shown in FIG. 1.

First, the process under normal conditions of the broadcast-type multicast communication system is described referring to FIG. 2.

In FIG. 2, the broadcast distribution server 1 transmits a multicast packet (source M, destination Gm_i; i is a natural number from 1 to n and n is a number of multicasts which are distributed on a same path, hereinafter "M, Gm_i") in which stream data to be distributed is included. In FIG. 2, four multicast packets (M, Gm_1,2,3,4) are shown as an example that is a case of "n=4". Hereinafter, it is called a "multicast group (M, Gm_i)" if multicasts which are distributed on a same path are not distinguished. That is, the multicast group (M, Gm_i) is a generic term for the multicasts which are distributed on the same path.

Each packet of the multicast group (M, Gm_i) is transmitted to the delay insertion server 5 and the aggregation server 20 respectively after being copied by the L2 switch 4, and is received by the servers 5 and 20.

The probe transmission server 3 transmits packets of the probe multicast (P, Gp) which are distributed on the same path as the multicast group (M, Gm_i), at predetermined intervals. For example, they are transmitted at intervals of 10 ms. The time intervals may be set to an appropriate value which is greater than an average value of intervals at which the broadcast distribution server 1 transmits packets of the multicast group (M, Gm_i). Packets of the probe multicast (P, Gp) are transmitted to the delay insertion server 5 and the aggregation server 20 respectively after being copied by the L2 switch 4, and are received by the servers 5 and 20.

The aggregation server 20 aggregates each of the multicast groups (M, Gm_i) into one aggregated multicast (A, Ga) and transmits it to the backup server 2. In this process, the probe multicast (P, Gp) which is distributed on the same path as that of the multicast group (M, Gm_i), is also aggregated into the aggregated multicast (A, Ga). Details of the aggregation process are described later.

The backup server 2 copies a packet of the aggregated multicast (A, Ga) which is received from the aggregation server 20, and generates two multicast packets. One of them is a packet of a synchronized backup multicast (B, Gab1) in which the transmission source is changed to B and the destination is changed to Gab1. Another is a packet of the delayed backup multicast (B, Gab2) in which the transmission source is changed to B and the destination is changed to Gab2.

The packet of the synchronized backup multicast (B, Gab1) is transmitted to the L3 switch 6b just after generation. On the other hand, the packet of the delayed backup multicast (B, Gba2) is transmitted to L3 switch 6b when a predetermined time passes after generation of it. Under normal conditions, the L3 switch 6b disposes either the packet of the synchronized backup multicast (B, Gab1) or the packet of the delayed backup multicast (B, Gab2) without passing them, when the L3 switch 6b receives them.

The delay insertion server 5 transmits the packets of the multicast group (M, Gm_i) and the packets of the probe multicast (P, Gp) which are received from the L2 switch 4, to the L3 switch 6a after a predetermined time. The delay time inserted here is equivalent to the-processing time that is required for the backup server 2 from receiving the packet of the aggregated multicast (A, Ga) to transmitting the packet of the synchronized backup multicast (B, Gab1) as described above. After inserting the delay, they are expressed the multicast group (M, Gm_i)' and the probe multicast (P, Gp)'. By inserting the delay, the processing time of the backup server 2 is compensated for and the multicast group (M, Gm_i)', the probe multicast (P, Gp)' and the synchronized backup multicast (B, Gab1) are synchronized with good precision.

The packets of the multicast group (M, Gm_i)' are transmitted to each of the sites 9 via the L3 switches 6a and 6c. Each of the client terminals 10 receives the packets of the multicast group (M, Gm_i)' and plays the stream data which is included in the multicast packets.

The packets of the probe multicast (P, Gp)' are distributed to the communication control apparatus 7 which subscribes to the destination Gp via the L3 switch 6a and 6c. The communication control apparatus 7 measures time intervals of reception of the packets of the probe multicast (P, Gp)'. Based on the measured time interval, communication of the packets of the multicast group (M, Gm_i)' is checked. Specifically, if the packet of the probe multicast (P, Gp)' is not received for a predetermined time, it is determined that communication of the packets of the multicast group (M, Gn_i)' may be broken. Due to the occurrence of this event, the communication control apparatus 7 starts the fault processing described later.

After detecting the communication break of the packets of the multicast group (M, Gm_i)', when receiving of the packets of the probe multicast (P, Gp)' is restarted, it is determined that the communication of the packets of the multicast group (M, Gm_i)' has broken restarted.

The multicast group (M, Gm_i)' and the probe multicast (P, Gp)' above are routed on the same communication path according to the construction (A-1, 2) below. (A-1) The destinations Gm_i and Gp are set to have a common RP (Rendezvous Point). (A-2) The transmission source P and the transmission source M are set as the same subnetwork. Alternatively, it is possible to apply the same address. It should be noted that different UDP port numbers are used if the same address is applied.

The probe transmission server 3 appends one of or both a sequence number and a time stamp to the packet of the probe multicast (P, Gp).

At the L3 switch 6c, a reception port of the receiving path from the L3 switch 6a and the transmission port of the transmission path to the communication control apparatus 7 are set to the same segment.

The fault processing of the broadcast-type multicast communication system shown in FIG. 1 is described next.

Figure 3:
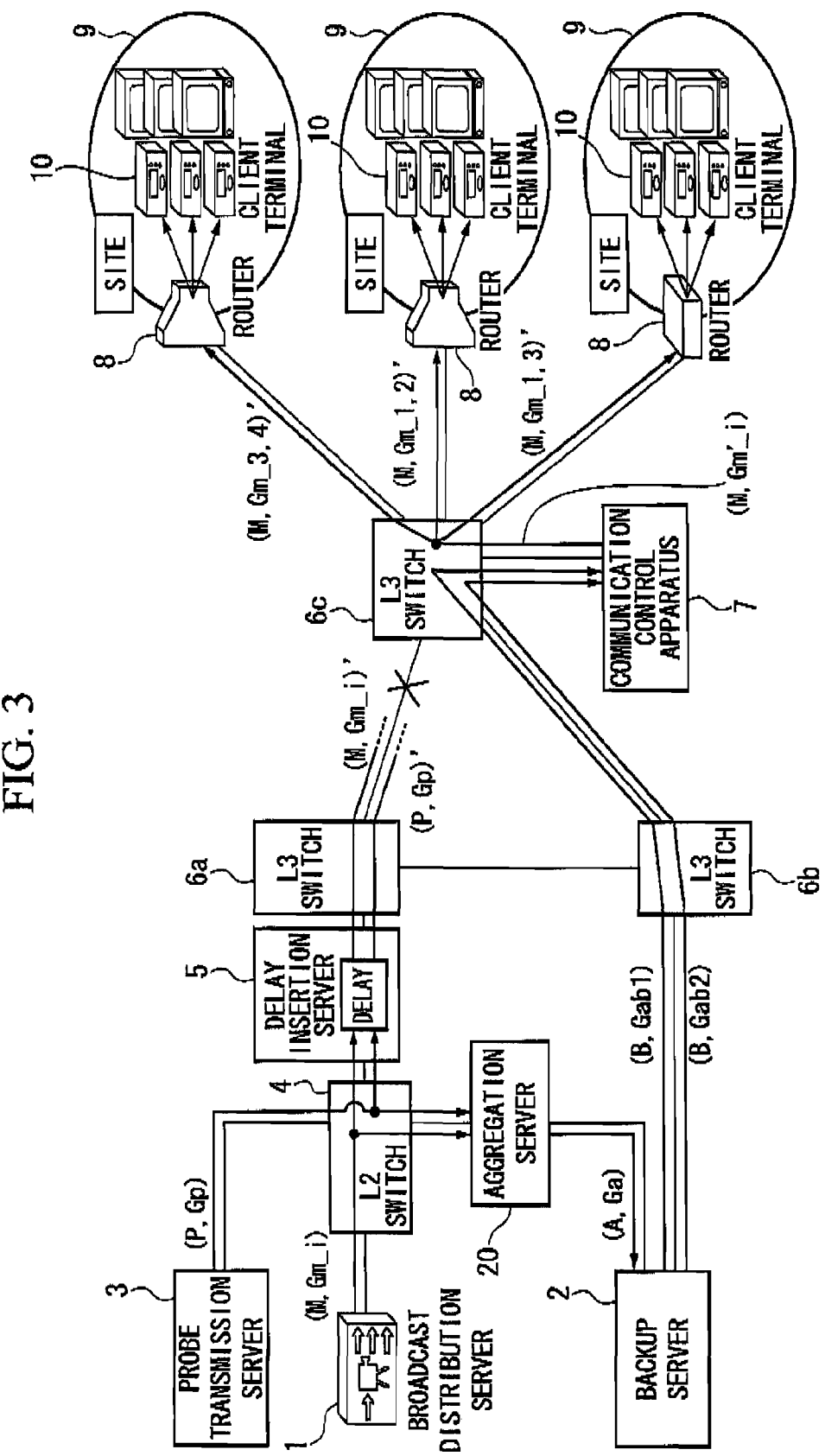
FIG. 3 is an explanatory diagram of an operation when a fault has occurred in the broadcast-type multicast communication system shown in FIG. 1.

FIG. 3 is an explanatory figure which shows the fault processing of the broadcast-type multicast communication system.

In FIG. 3, when the communication control apparatus 7 detects the communication break of the packets of the multicast group (M, Gm_i)' in the manner described above, it requests an attendance at the destinations Gab1 and Gab2 to the L3 switch 6c. In accordance with the request, it is requested to create a new distribution tree that is extended from the L3 switch 6b to the L3 switch 6c. Therefore, both the packets of the synchronized backup multicast (B, Gab1) and the delayed backup multicast (B, Gab2) are distributed to the communication control apparatus 7 via the L3 switch 6b and the L3 switch 6c.

The communication control apparatus 7, using both the packets of the synchronized backup multicast (B, Gab1) and the delayed backup multicast (B, Gab2), executes the distribution process upon the fault. Details of the distribution process upon the fault are described later.

On the other hand, after detecting the packet communication break of the multicast group (M, Gm_i)', when the receipt of the packets of the probe multicast (P, Gp)' is restarted, restarting of the packet communication of the multicast group (M, Gm_i)' is confirmed, and due to this event, the communication control apparatus 7 starts a fault recovery process described later.

Aggregation of the multicast and its recovery method are described next. Two aggregation methods (an IP encapsulation method and a UDP number conversion method) are described hereinafter. One of the two methods may be selected.

[IP Encapsulation Method]

Figure 4:
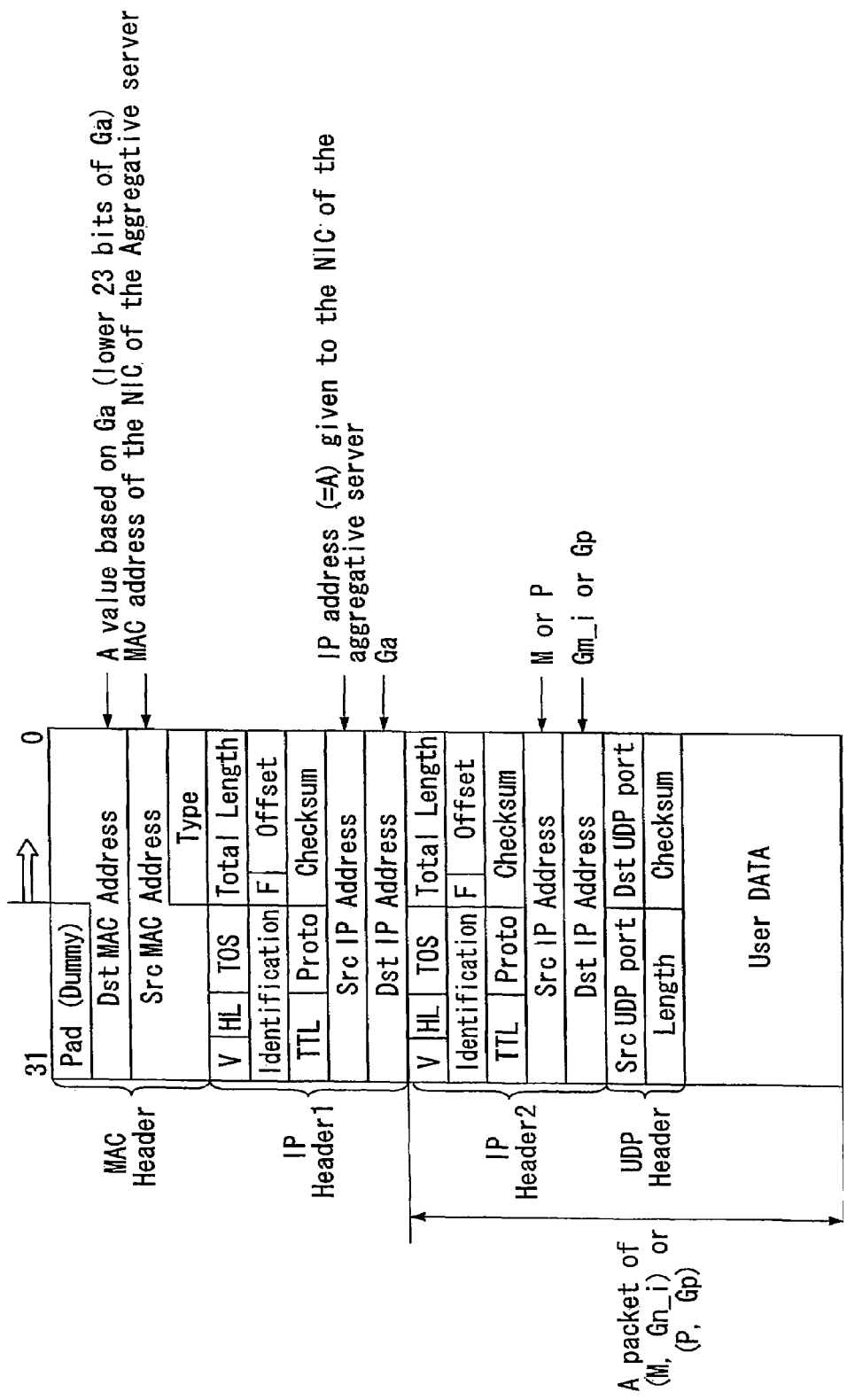
FIG. 4 is an overall schematic diagram of a packet of an aggregative multicast (A, Ga) in an IP encapsulation method.

FIG. 4 is an overall construction figure of the packet of the aggregative multicast (A, Ga) in the IP encapsulation method. As shown in FIG. 4, the packet of the aggregative multicast (A, Ga) of the aggregative multicast (A, Ga) is constructed in a manner such that an IP header including a distribution source A and a destination Ga is appended to the packet of the multicast group (M, Gm_i) or the probe multicast (P, Gp). Hence, the packet itself of the multicast group (M, G_i) or the probe multicast (P, Gp) is kept as it is, and therefore, the original packet header is not changed.

In the IP encapsulation method, the communication control apparatus 7 can recover each of the packet of the multicast group (M, Gm_i) or the packet of the probe multicast (P, Gp) by extracting the packet of the multicast group (M, Gm_i) or the probe multicast (P, Gp) from the packet of the aggregative multicast (A, Ga).

As described above, the communication control apparatus 7, upon the fault of the broadcast-type multicast communication system, receives the packet of the aggregative multicast (A, Ga) as the packet of the synchronized backup multicast (B, Gab1) and the delayed backup multicast (B, Gab2).

[UDP Number Conversion Method]

Figure 5:
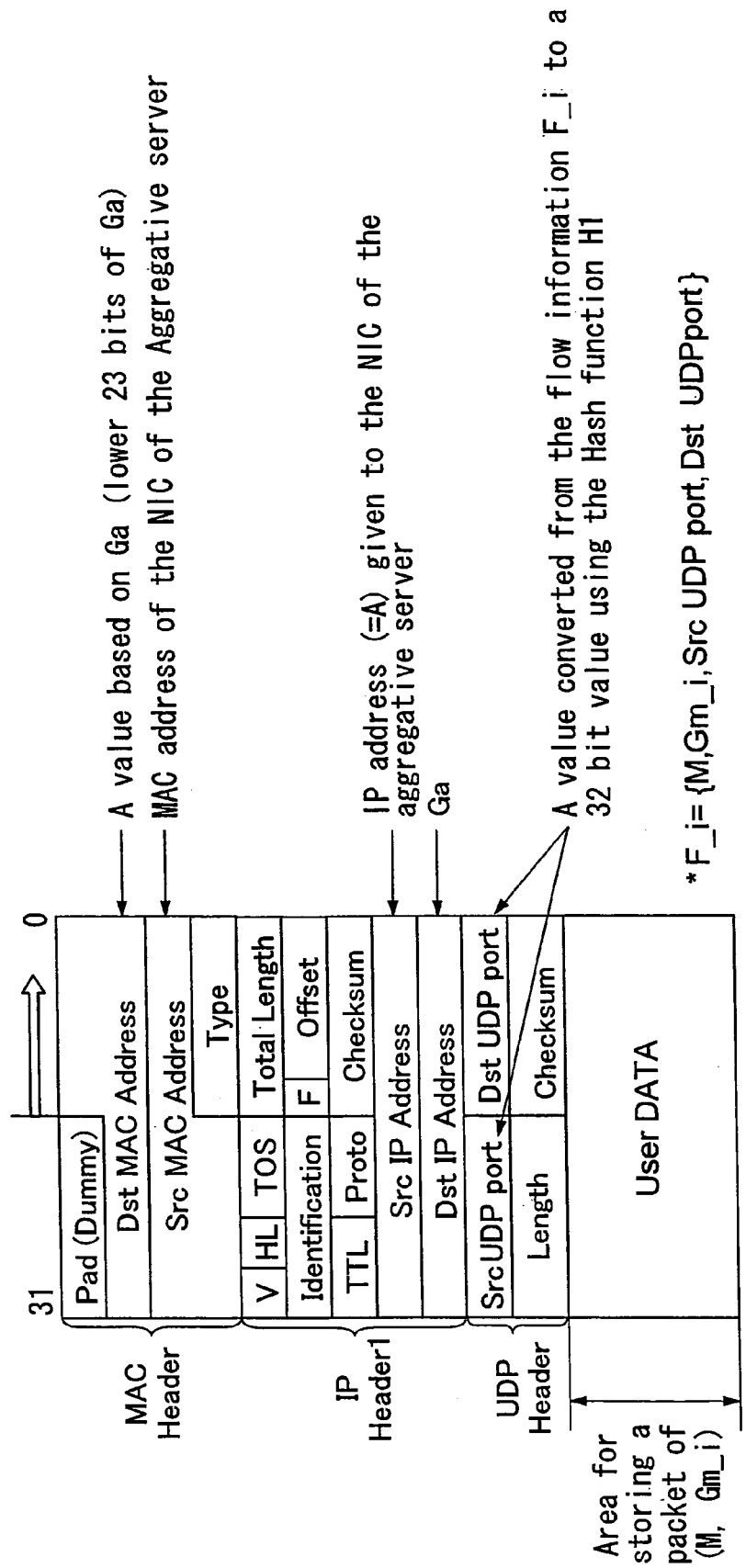
FIG. 5 is an overall schematic diagram of a packet of an aggregative multicast (A, Ga) corresponding to a multicast group (M, Gm_i) in a UDP port number conversion method.
Figure 6:
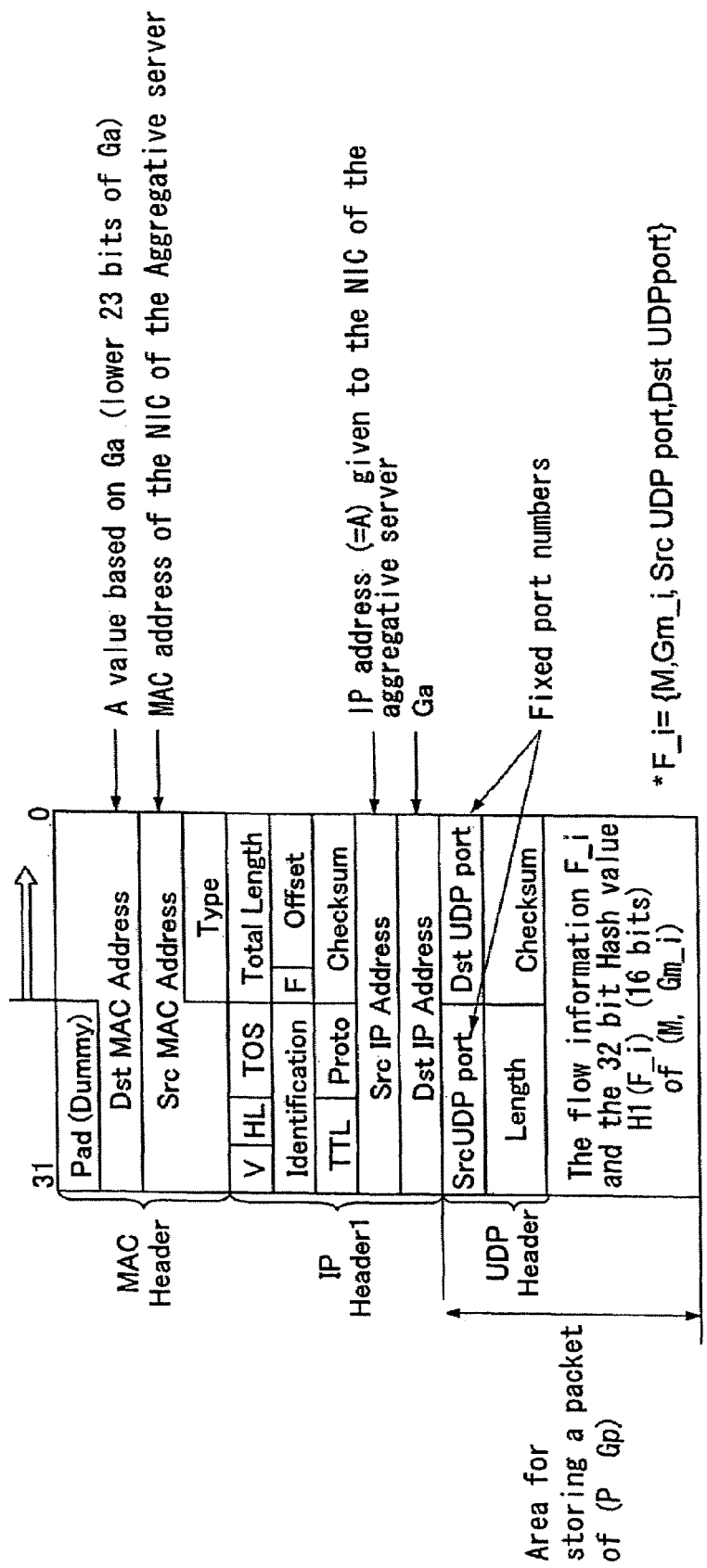
FIG. 6 is an overall schematic diagram of a packet of an aggregative multicast (A, Ga) corresponding to a probe multicast (P, Gp) in a UDP port number conversion method.

FIGS. 5 and 6 are overall construction figures of the packet of the aggregative multicast (A, Ga) in the UDP number conversion method, and FIG. 6 shows the probe multicast (P, Gp).

As shown in FIGS. 5 and 6, the packet of the aggregative multicast (A, Ga) is constructed in a manner such as including an IP header which indicates the distribution source A and the destination Ga of the aggregative multicast (A, Ga).

Concerning the multicast group (M, Gm_i), as shown in FIG. 5, a user data area is kept as the user data area of the original packet, but, a hash value H1 (F_i) obtained by converting flow information F_i to 32 bit value using the hash function H is set for the distribution source and the UDP port number field in the UDP header. The flow information F_i includes the IP address and the UDP port number of the distribution source M and the destination Gm_i. The flow information F_i is predetermined in a manner such that the hash value H1 (F_i) will not be duplicated.

Concerning the probe multicast (P, Gp), as shown in FIG. 6, the UDP header and the user data area are kept as they are in the original packet.

A fixed value is assigned to the UDP port numbers of the distribution source and the destination in the packet of the probe multicast (P, Gp) in advance. The fixed value is predetermined in a manner such that it will not conflict with the above described hash value H1 (F_i). A combination of the above described flow information F_i and its hash value H1 (F_i) is set for the user data area. Upon setting them, for the packets of the probe multi cast (P, Gp), the combinations are set cyclically in sequential order. For example, when "i=1-4", the combinations of the flow information F_1, 2, 3, 4 are set to the packet of the probe multicasts (P, Gp) in sequential order. Hence, the correspondence between the flow information F_i and the hash value H1 (F_i) is notified to the communication control apparatus 7. The combination of the flow information F_i and its hash value H1 (F_i) is, as described above, predetermined and stored in a memory of the probe transmission server 3.

Figure 7:
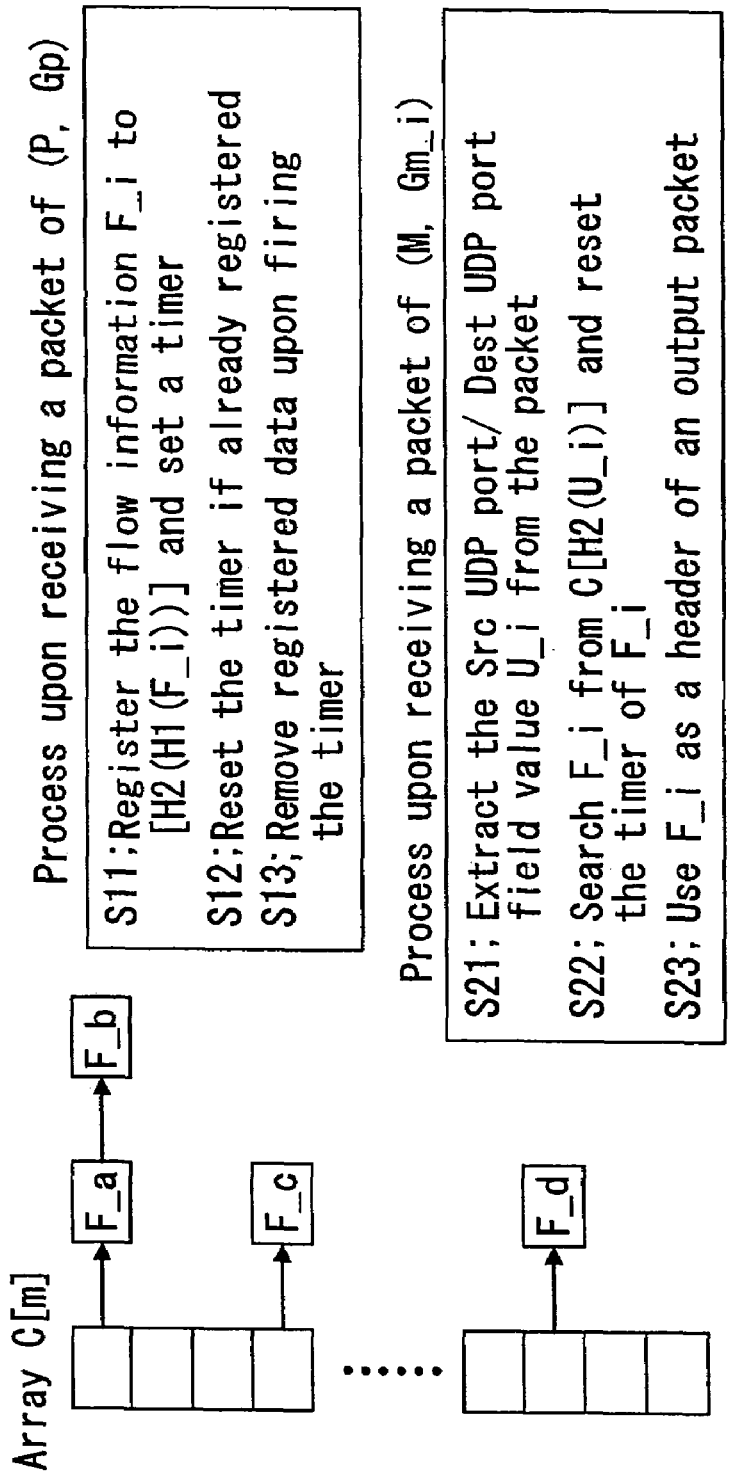
FIG. 7 is an explanatory diagram of a recovery process in a UDP port number conversion method.

In the UDP number conversion method, in accordance with the process shown n FIG. 7, the communication control apparatus 7 recovers the packets of the multicast group (M, Gm_i) from the packets of the aggregative multicast (A, Ga). Concerning the packet of the probe multicast (P, Gp), it can be distinguished with reference to the UDP port number (fixed values) of the distribution source and the destination. The packet of the multicast group (M, Gm_i) can be checked if the UDP port number of the distribution source and the destination of the UDP header included in the packet of the aggregative multicast (A, Ga) is a different value from the fixed value for the probe multicast (P, Gp).

As described above, the communication control apparatus 7, upon the fault of the broadcast-type multicast communication system, receives the packet of the aggregative multicast (A, Ga) instead of the packet of the synchronized backup multicast (B, Gab1) and the delayed backup multicast (B, Gab2).

Referring to FIG. 7, a process carried out upon receiving the packet of the probe multicast (P, Go), may be explained. The packet of the probe multicast (P, Gp) is distinguished with reference to the UDP port numbers (the fixed value) of the distribution source and the destination included in the UDP header.

In FIG. 7, the communication control apparatus 7 reads the combination of the flow information F_i and its hash value H1 (F_i) from the user data area of the packet (see FIG. 6) of the probe multicast (P, Gp) which is received, and stores them in memory for registration in a manner such as constructing a one-dimensional array C[m] in the memory for the registration. After that, a timer for the one-dimensional array C[m] which is registered is started (step S1). The value of the timer is set to be a time until removing of the registered combination from the memory for the registration (for example, 300 seconds).

However, if the combination which is read from the packet of the probe multicast (P, Gp) is already registered, then the timer is restarted (step S12).

A corresponding element of the one-dimensional array C[m] is removed form the memory for the registration if the timer reaches the timeout.

Due to the above described processing and structure, the one-dimensional array C[m] is created inside the memory for the registration of the communication control apparatus 7, and combinations of the flow information F_i and its hash value H1 (F_i) are stored for a certain time. The way to create the one-dimensional array C[m] is explained next. A hash value H2 (H1 (F_i)) is generated by applying a hash function H2 to the hash value H1 (F_i). In correspondence with the array variable m=H2 (H1 (F_i)), the flow information F_i and the time of its detection are stored as an element of the one-dimensional array C[m]. If the same hash value H2 (H1 (F_i)) is generated for different combinations, they are stored as the elements of the one dimensional array C[m] in a form of a linear list. If the element is already registered (step S12, described abobe), then only updating the detection time is processed. If the element has not been updated for a certain time (step S13, described above), the element of the one-dimensional array is removed. The hash value H2 (H1 FF_i)) is generated as an integer which is equal to or less than an appropriate natural number.

It is possible to determine whether or not to apply the process of the step S11, in correspondence with a probability p (o<p<=1) which varies in accordance with a certain condition. For example, the initial value of p is 1, and it is decreased as time goes by to a certain value which is considerably small (for example 0.01; a ratio of 1 time per 100 packets).

In reference to FIG. 7, a process carried out upon receiving the packet of the multicast group (M, Gm_i) is described below. The packet of the multicast group (M, Gm_i) can be detected because the UDP port numbers of the distribution source and the destination of the UDP header in the packet which belongs to the aggregative multicast (A, Ga) are different from a fixed value for the probe multicast (P, Gp).

In FIG. 7, the communication control apparatus 7 reads a hash value U_i from UDP port number fields of the distribution source and the destination in the UDP header included in the received packet of the multicast group (M, Gm_i) (see FIG. 5) (step S21).

The hash function H2 is applied to the hash value U_i and its hash value H2 (U_i) is generated. The flow information F_i which is an element of the one dimensional array C[m] corresponding to the array variable m=H2 (U_i) is searched and read from the memory for the registration. The timer corresponding to the element is restarted (step S22).

The original header of the packet of the multicast group (M, Gm_i) is recovered based on the read flow information F_i.

In accordance with the above described method, the multicast is aggregated and recovered.

A distribution method carried out on a fault is described next.

The communication control apparatus 7 performs a distribution process on a fault using both the packet of the synchronized backup multicast received upon a fault which is shown in FIG. 3, and the packet of the delayed backup multicast (B, Gab2). The outbound match detection method is explained as a example of a distribution method below.

Figure 8:
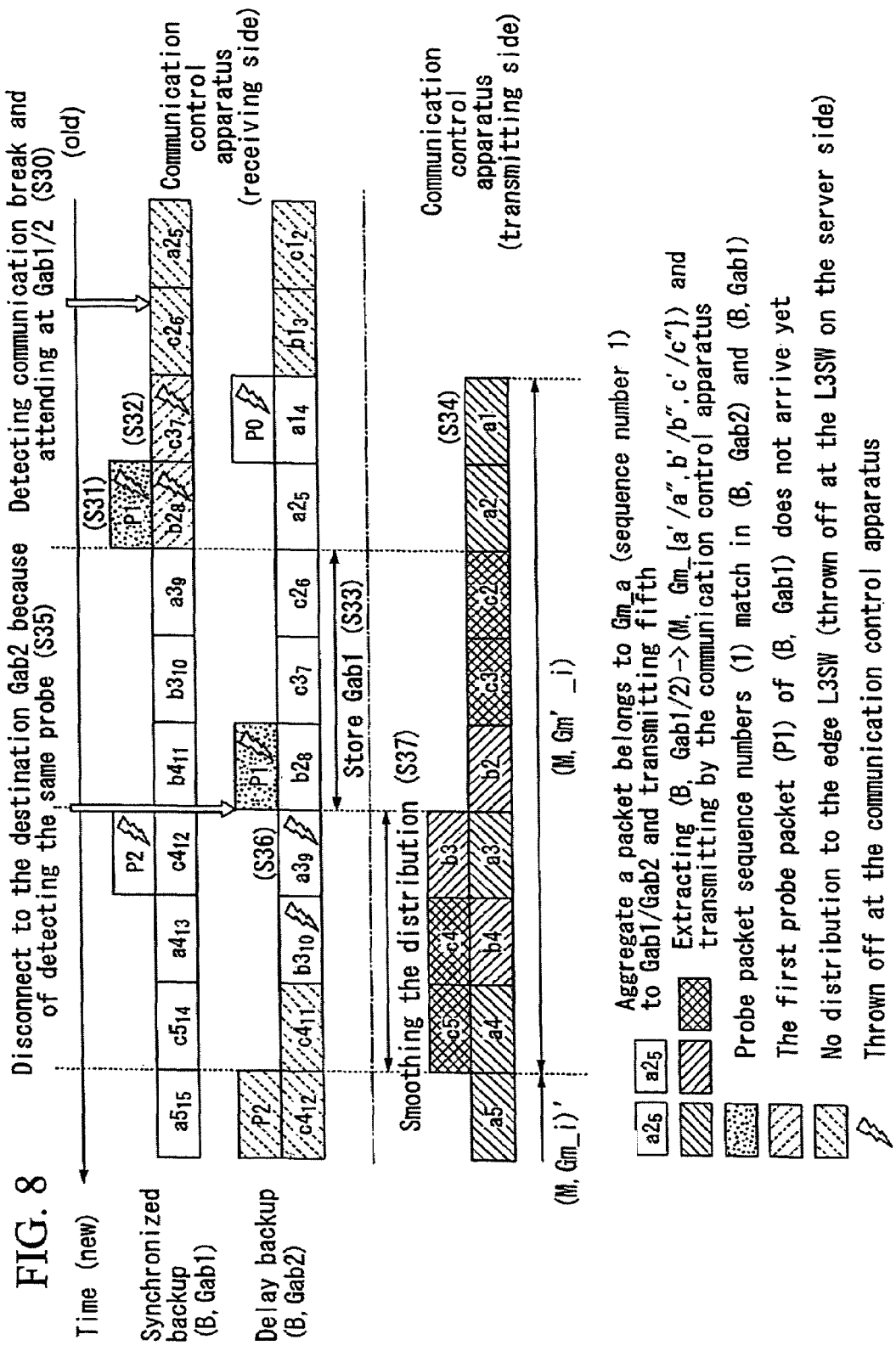
FIG. 8 is an outline figure of a distribution process carried out upon a fault in an embodiment of this invention.

FIG. 8 shows an outline figure for the explanation of the outbound match detection method.

In FIG. 8, first, the communication control apparatus 7 attends at the destinations Gab1 and Gab2 due to detection of the communication break of the packets of the multicast group (M, Gm_i) (step S30). After performing this process, the communication control apparatus 7 receives the packets of the aggregative multicast (A, Ga) as the packets of the synchronized backup multicast (B, Gab1) and the packets of the delayed backup multicast (B, Gab2), from the L3 switch 6c (see FIG. 3). In accordance with the method as described above, the packets included in the multicast group (M, Gm_i) and the packets of the probe multicast (P, Gp) are recovered from the packets of the aggregative multicast (A, Ga).

It should be noted that what is recovered from the synchronized backup multicast (B, Gab1) and what is recovered from the delayed backup multicast (B, Gab2) are different. Hereinafter, what is recovered from the synchronized backup multicast (B, Gab1) is called a synchronized multicast group (M, Gm_i1) and a synchronized probe multicast (P, Gp1), and what is recovered from the delayed backup multicast (B, Gab2) is called a delay multicast group (M, Gm_i2) and a delay probe multicast (P, Gp2).

In FIG. 8, the signs which are appended to each packet of the synchronized multicast group (M, Gm_i1), for example, "a25" mean that the letter "a" is used for distinguishing the multicast of the multicast group (M, Gm_i), "2" after the letter is a sequence number inside the multicast (M, Gm_a), and the appended number "5" after the sequence number is a sequence number inside the synchronized multicast group (M, Gm_i1). The signs which are appended to the packets of the delay multicast group (M, Gm_i2) are the same.

The communication control apparatus 7 stores a sequence number ("#1" for convenience) of the packet P1 of the synchronized probe multicast (P, Gp1) which is received first (step S31). It is possible to store the timestamp instead. A case of storing the sequence number is explained as an example below.

Packets c37 and b28 of the synchronized multicast group (M, Gm_i1) which are received before the packet P1 of the synchronized probe multicast (P, Gp1) are removed.

Packets of the synchronized multicast group (M, Gm_i1) which are received after the packet P1 of the synchronized probe multicast (P, Gp1) are enqueued in the transmission queue sequentially (step S33). In FIG. 8, packets a39, b310 and b411 of the synchronized multicast group (M, Gm_i1) are enqueued in the transmission queue sequentially.

A list structure ((P, Gp1) list) is generated for the linear search for the packets of the synchronized probe multicast (P, Gp1) in an order of the reception.

The packets of the delay multicast group (M, Gm_i2) which are received from the L3 switch 6c, are converted into the packets of the multicast group (M, Gm'_j) and transmitted to the L3 switch 6c (step S34). In FIG. 8, from the packets of the delay multicast group (M, Gm_i2), the conversion and the transmission to the L3 switch 6c are started. The packets of the multicast group (M, Gm'_i) are distributed to sites 9 via the L3 switch 6c.

The communication control apparatus 7, every time it receives the packet of the delay probe multicast (P, Gp2), compares the sequence number of the received packet ("#2" for convenience) to the stored sequence number "#1" at the step S31 above. If the condition "#2>=#1" is satisfied, then it disconnects the destination Gab2 (step S35). All the packets of the delay multicast group (M, Gm_i2) which are received after disconnecting the destination Gab2 are discarded (step S36). In FIG. 8, packets after the packet a39 are discarded.

If the condition "#2>=#1" is satisfied and "#2=#1" is not satisfied, the (P, Gp1) list is searched from the top in order to find the packet of the synchronized probe multicast (P, Gp1) which has the largest sequence number not greater than "#2". All the stored packets of the synchronized multicast group (M, Gm_i1) which are received before the packet of the synchronized probe multicast (P, Gp1) that is searched and found, are removed from the transmission queue.

Every time a new packet of the synchronized multicast group (M, Gm_i1) is received, the received packet is enqueued at the tail of the transmission queue and stored, and, N (for example, 2) packets from the top of the transmission queue which are stored, are converted into the packets of the multicast group (M, Gm'_i) and transmitted to the L3 switch 6c. (step S37). In FIG. 8, for example, when a packet c412 is received, the packet is enqueued at the tail of the transmission queue and stored, and two packets a39 and b310 on the transmission queue are converted into packets a3 and b3 in the multicast group (M, Gm'_i) and transmitted to the L3 switch 6c.

Because of this process, transmission of packets stored in the transmission queue in a burst-like manner can be prevented, and at the same time, packets which are kept in the transmission queue for a long period can be removed. Packets which are kept on the transmission queue for a long period can be removed, and therefore, the packets of the synchronized multicast group (M, Gm_i1) which are received from the L3 switch 6c can be transmitted to the L3 switch 6c without falling in arrears. This means that at the L3 switch 6c, receiving timing of the packets of the multicast group (M, Gm'_i) from the communication control apparatus 7 is synchronized to receiving timing of the packets of the multicast group (M, Gm_i)' from the L3 switch 6b. In FIG. 8, continuing to a packet a515 of the synchronized multicast group (M, Gm_i1), the status becomes synchronized.

The communication control apparatus 7, when the receipt of the packets of the probe multicast (P, Gp)' is restarted, detects that communication of the packets of the multicast group (M, Gm_i)' is restarted and starts the fault recovery process. In this fault recovery process, disconnection of the destination Gab1 is processed. The packets of the synchronized backup multicast (B, Gab1) are not distributed to the communication control apparatus 7, and therefore, the packets of the multicast group (M, Gm_i) based on the packets of the synchronized multicast group (M, Gm_i) are not transmitted from the communication control apparatus 7. At the L3 switch 6c, multicast packets to be transmitted to each site 9 are shifted from the multicast group (M, Gm'_i) to the multicast group (M, Gm_i)' smoothly.

As described above, this is because, at the L3 switch 6c, receiving timing of the packets of the multicast group (M, Gm'_i) from the communication control apparatus 7 is synchronized to receiving timing of the packets of the multicast group (M, Gm_i)' from the L3 switch 6b. Because of this process, loss of the multicast packets can be prevented during the fault recovery.

In this embodiment, upon switching from the multicast group (M, Gm_i)' to the multicast group (M, Gm'_i) at the time of detecting the fault described above, there is a possibility of packets to be distributed to each site 9 being duplicated. That is, there is a possibility that two packets are the same, namely a packet that is distributed as a packet of the multicast group (M, Gm_i)' to each site 9 just before switching and a packet that is distributed as a packet of the multicast group (M, Gm'_i) to sites 9 just after switching. In reference to FIG. 9, steps of processing avoid such duplication are described below.

First, the communication control apparatus 7 normally stores a sequence number of the packet of the probe multicast (P, Gp)' which is received from the L3 switch 6c. Instead of this, a time stamp may be stored. A case of storing the sequence number is explained as an example below.

Figure 9:
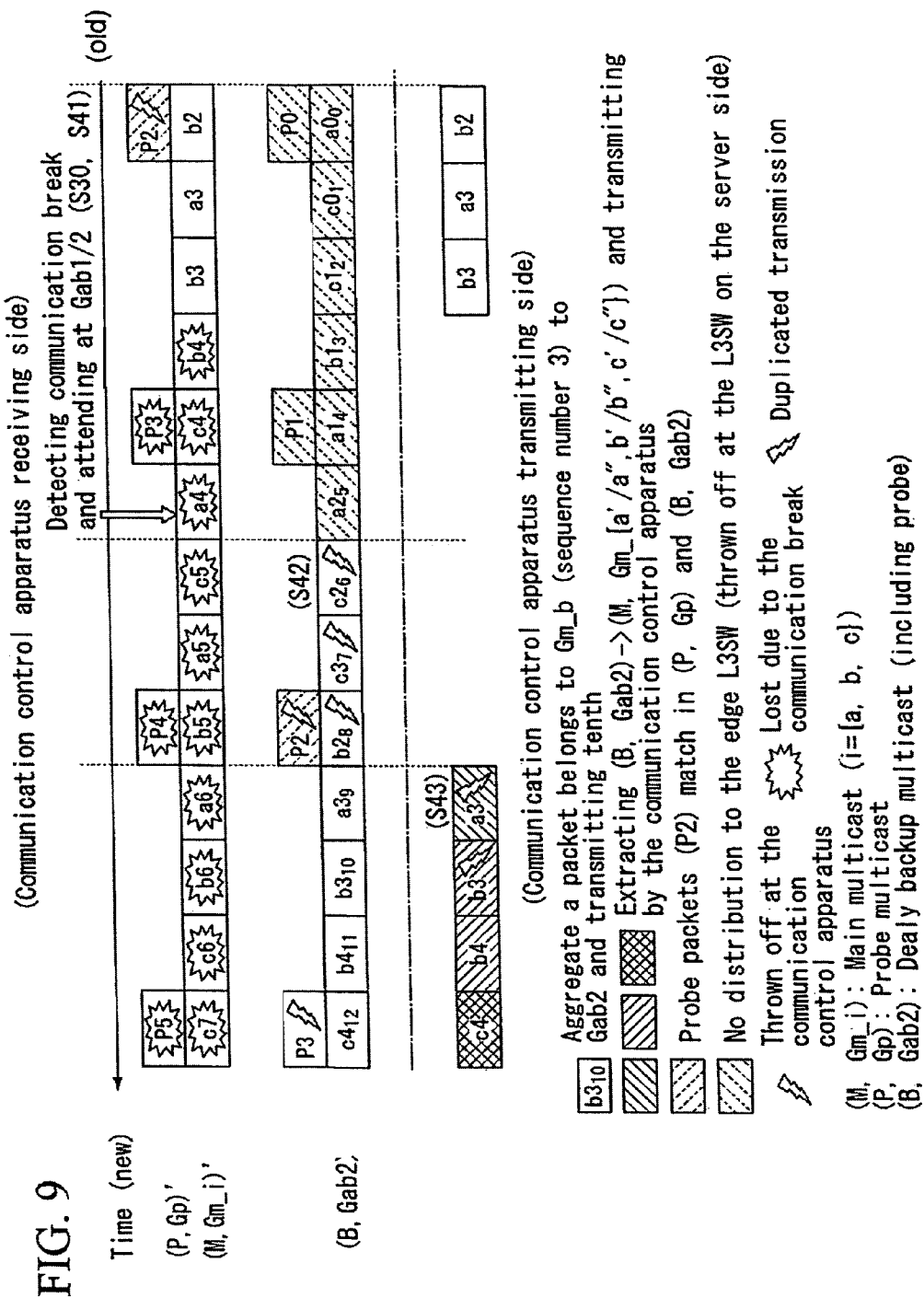
FIG. 9 is an outline figure of a distribution process carried out upon a fault in an embodiment of this invention.

In FIG. 9, first, the communication control apparatus 7 attends at the destinations Gab1 and Gab2 due to detection of a communication break of the packets of the multicast group (M, Gm_i)' (step S30).

A sequence number ("#3" for convenience) of the packets P2 of the probe multicast (P, Gp)' which is received from the L3 switch 6c is stored (step S41).

Following the processes above, the distribution process carried out on a fault is started. It should be noted that the packets of the delay multicast group (M, Gm_i2) are not converted into the multicast group (M, Gm'_i) and transmitted to the L3 switch 6c immediately, but are stored in the transmission queue according to the receiving order. Procedures corresponding to the following conditions (B-1, 2, 3) are processed. It is possible for, before receiving the first packet of the delay probe multicast (P, Gp2), the received packets of the delay multicast group (M, Gm_i2) to be converted into the multicast group (M, Gm'_i) and transmitted to the L3 switch 6c.

Each time a packet of the delay probe multicast (P, Gp2) is received, the sequence number ("#4" for convenience) of this received packet is compared with the sequence number "#3" which is stored at the above described step S41.

(B-1) If the condition "#4<=#3" is satisfied, the packets of the delay multicast group (M, Gm_i2) which are stored in the transmission queue are discarded (step S42). In FIG. 9, packets c26, c37 and b38 are discarded.

(B-2) In addition to the above condition (B-1), if the condition "#4=#3" is satisfied, then the packets of the delay multicast group (M, Gm_i2) which are received thereafter are converted into the multicast group (M, Gm'_i) and transmitted to the L3 switch 6c (step S43). In FIG. 9, from a packet a39, the conversion and the transmission to the L3 switch 6c are started. The packets of the multicast group (M, Gm'_i) are distributed to each site 9 via the L3 switch 6c.

(B-3) On the other hand, if the condition "#4>#3" is satisfied, the packets of the delay multicast group (M, Gm_i2) which are stored in the transmission queue are converted into the packets of the multicast group (M, Gm'_i) and transmitted to the L3 switch 6c sequentially. It is possible to prevent packet transmission in a burst-like manner when transmitting the packets in the transmission queue by controlling the transmission in accordance with the receiving timing of the packets of the synchronized multicast group (M, Gm_i1) as described above.

As shown in FIG. 9, upon switching from the multicast group (M, Gm_i)' to the multicast group (M, Gm'_i), there is a possibility of there being a few duplicated packets, however, the amount of the duplication can be dramatically decreased compared to in a case without the above described solution. Therefore, the efficiency of use of the communication line can be improved.

As shown in the embodiment above, if it is checked whether or not the communication of the packets of the multicast group (M, Gm_i)' is restarted in reference to restarting of receiving of the packets of the probe multicast (P, Gp)', then it may be supposed that timing cannot be coincident between restarting receiving of the packets of the probe multicast (P, Gp)' and restarting communication of the packets of the multicast group (M, Gm_i)'. Therefore, at the time when the restart of receiving the probe multicast (P, Gp)' is detected, a timer (for example, 10 ms) is started and the transmission of the multicast group (M, Gm'_i) is stopped after the timer reaches a timeout. By performing such process, the communication control apparatus 7 controls a transmitting and stopping timing of the multicast group (M, Gm'_i) at the time of the fault recovery.

According to the above described embodiment, the following effects can be obtained.

It is possible to monitor the distribution breaks of many multicasts overall by aggregating the multicast group (M, Gm_i) and the probe multicast (P, Gp), which are constructed from multiple multicasts, into the aggregative multicast (A, Ga). Similarly, it is possible to detect the distribution recovery of multiple multicasts overall. Therefore, the processing load of the communication control apparatus is decreased.

By applying the aggregation methods of the multicasts, the amount of the backup multicast which attend after detection of the distribution break (the backup multicast (B, Gab1) and the delayed backup multicast (B, Gab2)), can be kept to under a certain number, even when the number of the original multicasts increases. Therefore, it is possible to reduce the processing load of the communication control apparatus and a router of the network, and to reduce the waiting time until receiving of the packets of the backup multicast. Moreover, it is possible to reduce the management cost of the communication control apparatus because it is not necessary to register the multicast group (M, Gm_i) into the communication control apparatus.

While preferred embodiments of the invention have been described and illustrated above referring to figures, it should be understood that these are exemplary of the invention and are not to be considered as limiting. Additions, omissions, substitutions, and other modifications can be made without departing from the spirit or scope of the present invention.

For example, it is possible to realize an example as shown below.

EXAMPLE

Figure 10:
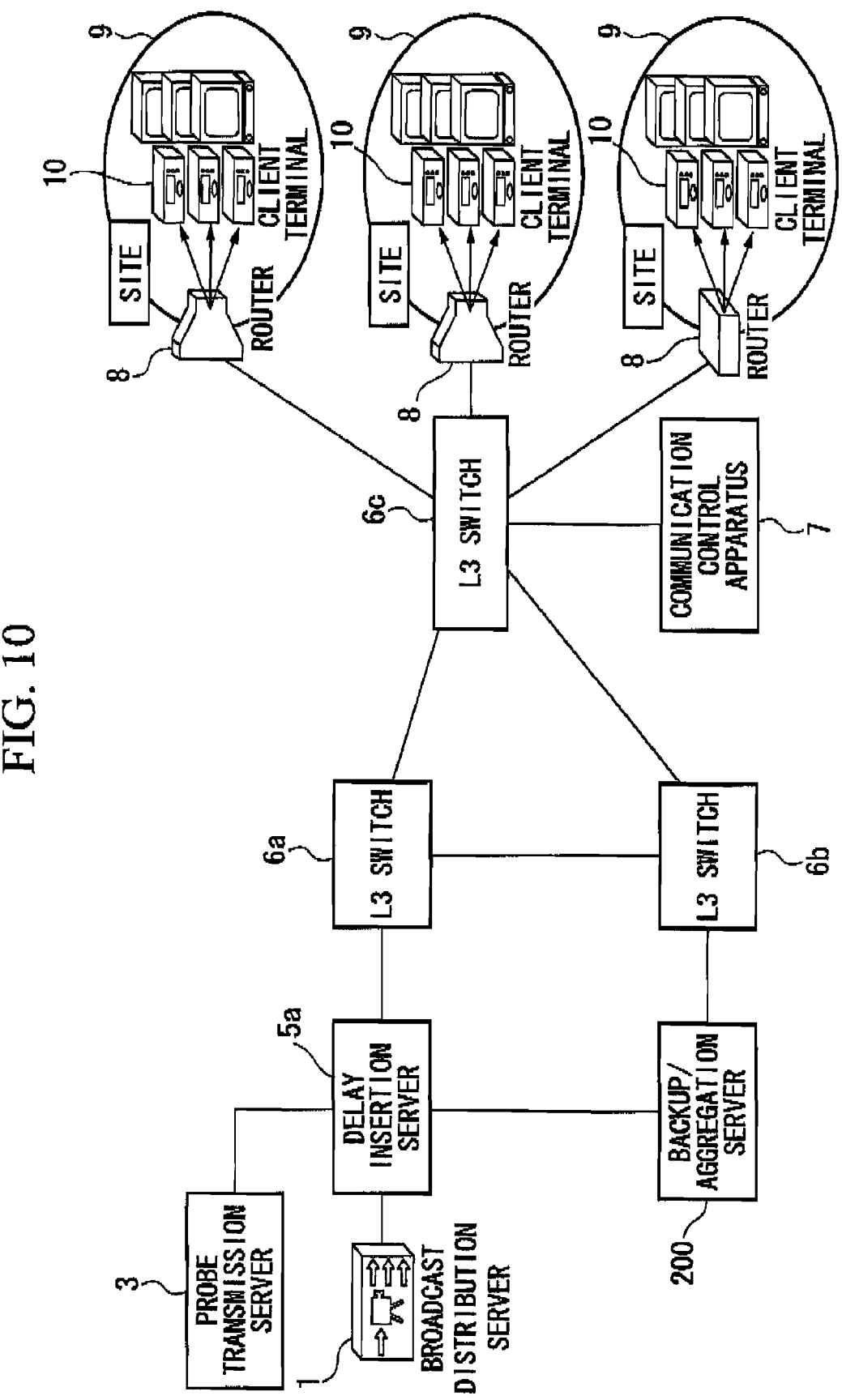
FIG. 10 is a block diagram of an example of the embodiment shown in FIG. 1.

FIG. 10 is a construction block diagram of an example which is shown in FIG. 1 as the embodiment.

In the example shown in FIG. 10, functions of both the backup server 2 and the aggregation server 20 are realized in a server apparatus (backup/aggregation server 200). A delay insertion server 5a realizes functions of the L2 switch 4 as well.

As a broadcast distribution server 1, a multicast station for general usage is run on a personal computer (PC). As the delay insertion server 5a, the backup/aggregation server 200 and the communication control apparatus 7, a PC in which multiple NICs (Network Interface Cards) are installed, is applied. As the probe transmission server 3, a PC is applied on which a real-time OS can be executed. As the L3 switch 6a, 6b, 6c, products on the market (for example, "Catalyst Switch" manufactured by CISCO Systems, Inc.) are applied. A concrete construction is shown below.

The probe transmission server 3 transmits the packets of the probe multicast (P, Gp) every 10 ms by executing a real-time probe transmission application on the real-time OS.

The delay insertion server 5a realizes functions of the L2 switch 4 by applying installed four NICs. The broadcast distribution server 1, probe transmission server 3, backup/aggregation server 200 and L3 switch 6a are connected via the delay insertion server 5a. The delay insertion server 5a receives the packets both the multicast group (M, Gm_i) transmitted from the broadcast distribution server 1 and the probe multicast (P, Gp) transmitted from the probe transmission server 3, and forwards them to both the L3 switch 6a and the backup/aggregation server 200 (corresponding to the multicast group (M, Gm_i)' and the probe multicast (P, Gp)'). When transmitting to the backup/aggregation server 200, no delay is inserted.

The backup/aggregation server 200 continuously receives the packet of the multicast group (M, Gm_i) which is transmitted from the broadcast distribution server 1 and the packet of the probe multicast (P, Gp) which is transmitted from the probe transmission server 3, by using the NIC which is connected to the delay insertion server 5a. The backup/aggregation server 200 converts the received packet of the multicast group (M, Gm_i) and the received packet of the probe multicast (P, Gp) to one packet of the aggregative multicast (A, Ga). After that, the backup/aggregation server 200 copies the packet of the aggregative multicast (A, Ga) in order to generate a packet of the synchronized backup multicast (B, Gab1) and a packet of the delayed backup multicast (B, Gab2), and transmits them to the L3 switch 6b. Here, a certain delay is inserted into the delayed backup multicast (B, Gab2).

The communication control apparatus 7 connects to the L3 switch 6c at the edge part close to a client, and attends at the destination Gp. By monitoring the receiving interval of the packets of the probe multicast (P, Gp)', a packet communication break of the multicast group (M, Gm_i)' can be detected. If the communication break is detected, the communication control apparatus 7 attends at the destinations Gab1 and Gab2 at the same time. A request of the attendance is issued to the L3 switch 6c at the edge part.

The communication control apparatus 7 converts the synchronized multicast group (M, Gm_i1) or the delay multicast group (M, Gm_i2) into the packet of the multicast group (M, Gm'_i) and transmits it to a receiving interface for the packet of the multicast group (M, Gm_i)' located upstream of the L3 switch 6c of the edge part. This structure makes it possible to avoid duplication during packet distribution by comparing the probe multicast (P, Gp)', the synchronized probe multicast (P, Gp1) and the synchronized probe multicast (P, Gp2) appropriately, which are received from the L3 switch 6c of the edge part. Therefore, the packets of the multicast group (M, Gm"_i) are distributed to each site 9 via the same path as that of the multicast group (M, Gm_i)'.

It should be noted that the "IP ID field" is adjusted in a manner such that the "IP checksum field" has a value of "0x7FFE" or "0xFFFE", in order to make it possible to determine that the multicast group (M, Gm'_i) has been converted from the synchronized multicast group (M, Gm_i1) or the delay multicast group (M, Gm_i2).

The above described packet transmission of the multicast group (M, Gm'_i) that is from the communication control apparatus 7 to the L3 switch 6c of the edge part, can be realized by, for example, transmitting to the L3 switch 6c using the originating MAC address of the NIC. This is aiming that the L3 switch in this example processes multicast packets equally even when the originating MAC address is different.

Restarting of the communication of the packets of the multicast group (M, Gm_i)' is detected by checking whether or not receiving of the packets of the probe multicast (P, Gp) from the L3 switch 6c of the edge part has been restarted.

In accordance with the present invention, upon providing the broadcast-type multicast communication services via IP network with a redundant structure, it becomes possible to reduce the processing load for communication control in a condition of plural multicasts.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system on an IP network which supports multicast communication in broadcast-type multicast communication, comprising:

a distribution server which transmits a plurality of packets in a broadcast form of a plurality of main multicasts that are distributed on a same path;

a probe transmission server which transmits packets of a probe multicast at certain intervals on the same path as that of a main multicast;

a delay insertion server which transmits the packets of the main multicast and the probe multicast to the IP network after inserting a certain delay;

an aggregation server which converts the plurality of packets of the main multicast and the probe multicast into an aggregative multicast;

a backup server which copies a packet of the aggregative multicast, generates a packet of a synchronized backup multicast based on the copied packet, transmits the packet of the synchronized backup multicast to the IP network, generates a packet of a delay backup multicast by applying a certain delay to the copied packet, and transmits the packet of the delayed backup multicast to the IP network; and a communication control apparatus which receives the packet of the probe multicast from the IP network, determines an overall communication condition of the plurality of the packets of the main multicast based on intervals of the packet of the probe multicast, wherein the communication control apparatus receives the packets of the delayed backup multicast and the synchronized backup multicast from the IP network and recovers the packet of the main multicast, if a communication break of the plurality of the packets of the main multicast is detected.

2. The communication system according to claim 1, wherein the aggregation server aggregates the multicast in an IP encapsulation method.

3. The communication system according to claim 1, wherein the aggregation server embeds recovery information in a predetermined field of a header of the packet to be aggregated.

4. The communication system according to claim 3, wherein by using a predetermined conversion function, the recovery information is converted to have a data length of the predetermined field.

5. The communication system according to claim 4, wherein a correspondence relationship between the multicast to be aggregated and the converted recovery information is embedded in the packet of the probe multicast, and the communication control apparatus refers to the correspondence relationship.

6. The communication system according to claim 1, wherein the distribution server broadcasts stream data by transmitting a plurality of packets.

* * * * *